May 25, 1965     O. T. JATZECK     3,184,881
KING CRAB POT
Filed March 25, 1963     2 Sheets-Sheet 2
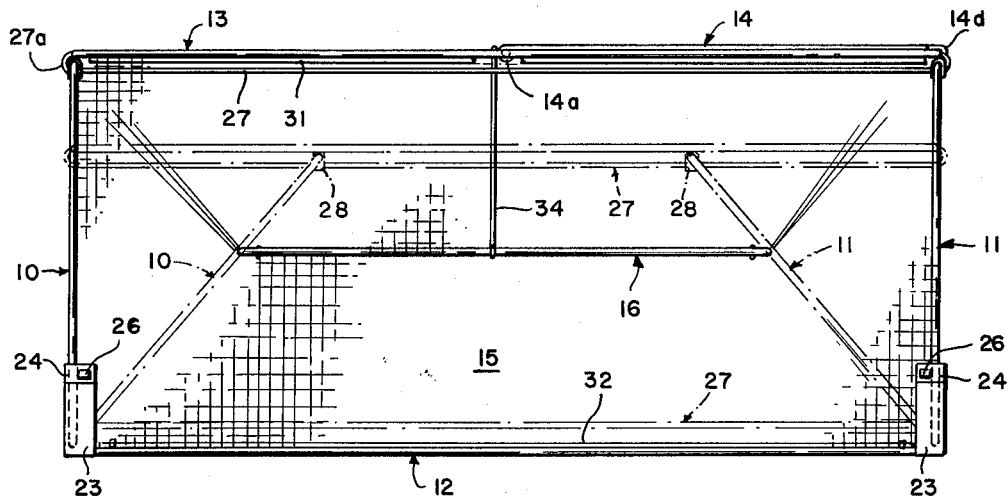
FIG__2
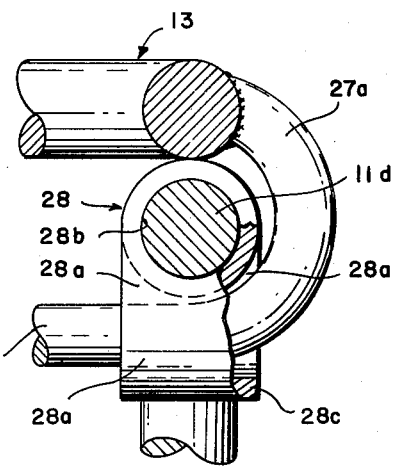
FIG__3
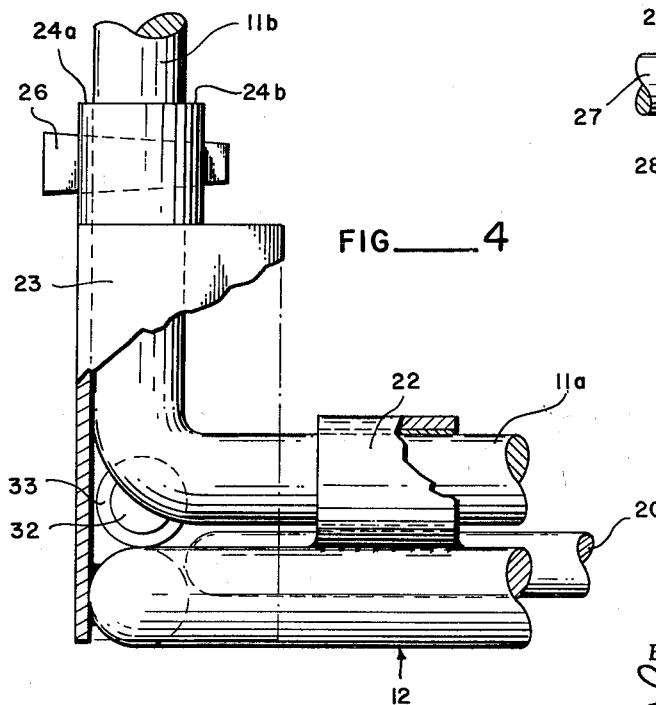
FIG__4
ORLO T. JATZECK
INVENTOR.
BY Seed & Berry
ATTORNEYS ation in the novel construction and in

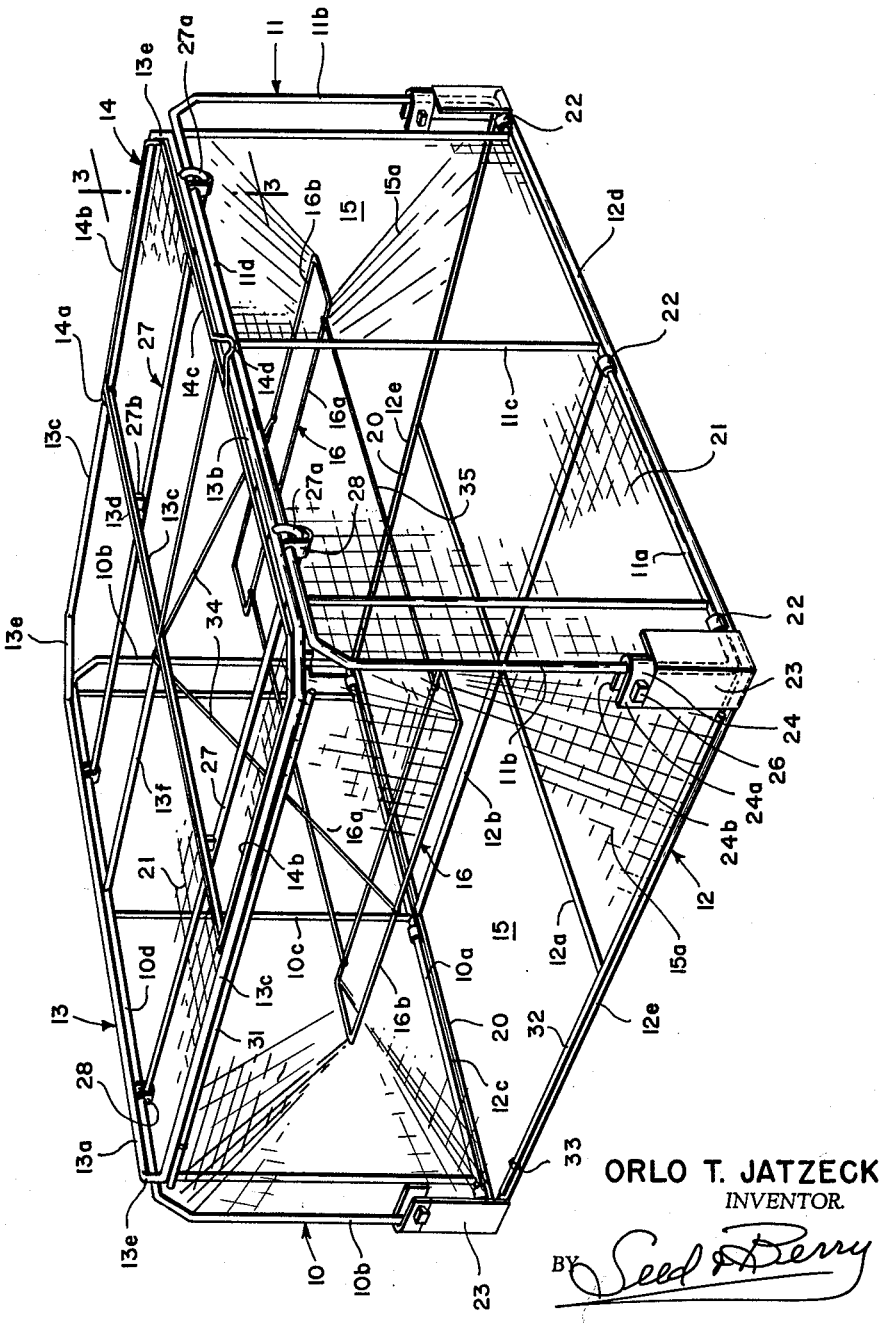

United States Patent Office 3,184,881
Patented May 25, 1965

3,184,881
KING CRAB POT
Orlo Thomas Jatzeck, Valdez, Alaska, assignor of one-half to James T. Johnson
Filed Mar. 25, 1963, Ser. No. 267,635
4 Claims. (Cl. 43—102)

The present invention relates to an improved pot or trap for catching the species of crab known as the "king crab" which is a crustacean of the family *Paralithodes camtschatica*. This species is unusually large, frequently having a span of about six feet with a top weight of about 25 pounds, the average being about 8 to 10 pounds each. Thus the pots for trapping king crabs must be large, normally about 7 or 8 feet across and 3 or 4 feet high. Since the pots must be stored aboard the fishing vessel to and from the north Pacific Ocean and the Bering Sea, it is important that the pots require as little storage space as possible.

Accordingly, the present invention aims to provide a crab pot which is of simple, economical and durable construction, and yet can be easily collapsed into a compact unit for storage without sacrifice of operating effectiveness.

Other objects and advantages in view will appear and be understood in the following description and claims, the invention consisting in the novel construction and in the adaptation and combination of parts hereinafter described and claimed.

In the accompanying drawings:

FIG. 1 is a perspective view of the crab pot in expanded operative position;

FIG. 2 is a side elevational view of the crab pot and illustrating in broken lines a partially collapsed and fully collapsed condition;

FIG. 3 is a detail vertical sectional view taken as indicated by line 3—3 of FIG. 1; and FIG. 4 is a detail fragmentary elevational view of one of the corners of the crab pot.

Referring to the drawings it is seen that my pot has an open mesh-covered collapsible framework fabricated from bar stock and comprises matching front and back frames 10–11 which are swingably mounted at their lower ends at opposite ends of a primary bottom frame 12 and carry a top frame 13 which collapses downwardly when the front and back frames are folded inwardly. The top frame includes a gate 14 and the two vertical sides of the pot comprise opposed tapered mesh tunnels 15—15 with their reduced inner ends defined by respective horizontal rectangular rims 16.

The bottom frame 12 may be square in outline and has cross-braces 12a–12b between the front and back rails 12c–12d and between side rails 12e—12e. A secondary frame 20 slightly smaller in a real extent than the primary bottom frame is welded thereon so as to be spaced above the ground and from the front, back and side edges of the bottom frame. Flexible webbing 21, preferably of stainless steel wire is stretched across this secondary frame and is protected by the primary bottom frame from abrasive contact with the ocean floor.

Bearing blocks 22 with stainless steel bushings are fixedly mounted on the top of the front and back rails 12c–12d of the bottom frame and receive the bottom rails 10a–11a of the front and back frames 10–11. These frames have a rectangular border with vertical side legs 10b—10b and 11b—11b, and center legs 10c and 11c extending upwardly from the bottom rails 10a–11a, respectively, to top rails 10d–11d. At the four lower corners of the pot short posts 23 of angle stock with U-shaped shackles 24 at the top thereof are welded to the bottom frame 12 and hold the legs 10b and 11b from swinging outwardly away from a vertical position. These shackles have their arms 24a–24b formed with registering openings to receive cotters 26 for holding the legs 10b and 11b upright against the posts 23. The cotters are tapered and the openings in the inner arms 24b are correspondingly smaller than those in the outer arms so that the cotters can be driven into firm locking position.

Directing attention to the upper end of the pot, it is seen that the border of the top frame 13 corresponds in size to that of the bottom frame 12, but has beveled corners 13e so that the top frame will clear the posts 23 when it is collapsed downwardly. To perform this collapsing the front and back rails 13a and 13b of the top frame are interconnected, not only by the side rails 13c—13c, but by a pair of track rods 27—27 which are suspended by turned-up end portions 27a welded at the top to the outer faces of the rails 13a–13b. The top frame 13 is traversed by a center cross-bar 13d which also helps support the track rods by respective depending lugs 27b. For walking along the track rods 27 the front and back frames 10–11 each have a pair of slides 28—28, one for each track rod, which are turnably mounted on the upper rails 10d–11d. These slides may each comprise an inverted U-shaped strap having its two depending arms 28a each formed with a journal opening 28b for receiving the related upper rail 10d or 11d. The distance from the journal openings 28b up to the web 28c of these slides 28 exceeds the diameter of the track rods 27 so as to loop thereover and secure the top frame 13 to the top of the front and back frames 10–11. At the same time the slides 28 can walk inwardly along the track rods 27 responsive to inward folding of the front and back frames to collapse the pot for storage. During such collapsing the walking slides 28 remain substantially upright while the upper rails 10d–11d of the inwardly folding front and back frames turn in the journal openings 28b of the slides.

The gate 14 has a rectangular border frame encompassing the rear half of the top frame 13. It is swingably mounted on the cross-bar 13d of the top frame by eyes 14a formed at the forward ends of the side rods 14b of the gate. The rear rod 14c of the gate has a center rearwardly projecting loop 14d to rest on the top rail 11d of the back frame and be tied or otherwise secured thereto after the pot has been baited. A longitudinal center brace 13f for the top frame may be provided extending between its cross-bar 13d and front rail 13a. The front half of the top frame, the gate frame 14, and the front and back frames 10–11 are also covered with the webbing 21.

Continuing to the tunnels 15, each is preferably formed of coated nylon webbing 15a looped top and bottom over supplemental top and bottom wood rails 31–32 which are in turn wire tied to the side rails 13c and 12e, respectively, of the top and bottom frames. Spacers 33 on these side rails provide a gap between the supplemental rails and the side rails to which they are tied so that the end portions of the tunnel webbing are free to slide along the supplemental rails during erection and collapsing of the pot. The webbing 15a of the tunnels is tied to the related corner legs 10b and 11b, and hence these legs together with the supplemental rails 31–32 define the outer mouths of the tunnels 15. The width of tunnel webbing extending from the lower supplemental rail 32 to the inner longitudinal side 16a of the rim 16 at the inner reduced end of each tunnel is greater than that of the webbing between the upper supplemental rail 31 and the outer side 16b of the rim. In this manner the rims 16 are made horizontal when pulled toward one another as by a pair of elastic ties 35 secured at their ends to the inner sides 16a of the rims. A third elastic tie 34 may be secured at its ends to the outer sides 16b of the rims and looped over the inner end portion of the top brace 13f. The supplemental rails may be conveniently fed through the tunnel webbing before installation of the tunnels, and since they are spaced above the bottom of the pot the tunnel webbing is protected from abrasion on the ocean floor. Nevertheless, it is of course necessary to replace the tunnel webbing from time to time, but this is expedited by the supplemental rail arrangement in that the webbing loops at the bottom outer edge of the tunnels do not have to be individually tied to the framework of the pot and replacement tunnels can be conveniently stored in rolled condition with a set of the wood supplemental rails 31 threaded at the top and bottom thereof.

To erect the pot from collapsed storage position it is only necessary to pull outwardly on the upper part of the front and back frames 10–11 thereby swinging them upwardly about the bottom bearings 22. During this swinging action the slides 28 walk outwardly along the track rods 27 and this causes the top frame 13 to rise together with the swinging upper ends of the front and back frames. Then, when the latter reach an upright position with their legs 10b–11b engaging the corner posts 23, the cotters 26 are driven into locking position in the shackles 24. This completes erection of the pot. Reversal of these steps collapses the pot into a compact storage condition with the tunnels 15 and their rims 16 between the folded front and back frames 10–11 and the bottom frame 12 and with the top frame 13 lowered onto the latter and lying between the corner posts 23.

The erected pot is baited on deck for use through the gate 14 and then after the loop 14d has been secured to the top rail 11d of the back frame, the pot is lowered into the water and to the bottom by lines tied to the top rail 10d of the front frame. When the pot is retrieved it is hoisted over the side of the fishing vessel and the catch dumped out through the gate after freeing the loop 14d from the top rail 11d.

It is thought that the invention will have been clearly understood from the foregoing detailed description. Changes will suggest themselves and may be resorted to without departing from the spirit of the invention, wherefore it is my intention that no limitations be implied and that the hereto annexed claims be given a scope fully commensurate with the broadest interpretation to which the employed language admits.

What I claim is:

1. A crab pot comprising a collapsible open framework having top and bottom frames, front and back frames hingedly connected at the front and back of said bottom frame for folding inwardly toward one another in overlapping relation to said bottom frame, track means on said top frame extending from the front to the back thereof, slide means mounted on the top of said front and back frames and slidably mounted on said track means for holding said top frame on said front and back frames and for lowering said top frame responsive to said folding of the front and back frames, releasable locking means for locking said front and back frames upright, a tapered crab entry tunnel between said front and back frames, and webbing covering said framework including said tunnel.

2. The crab pot of claim 1 in which said bottom frame has rigid short corner posts engaged by said front and back frames when they are in upright position and in which said releasable locking means is carried by said posts and holds said front and back frames against said posts.

3. A crab pot comprising a collapsible open framework having top and bottom frames, front and back frames hingedly connected at the front and back of said bottom frame for holding inwardly toward one another in overlapping relation to said bottom frame, a pair of spaced tracks mounted on said top frame and extending from the front to the back thereof, two pairs of slides journal-mounted, one pair on the top of said front frame and the other pair on the top of said back frame, said slides also being slidably mounted on said track means for holding said top frame on said front and back frames and for lowering said top frame responsive to said folding of the front and back frames, releasable locking means for locking said front and back frames upright, a tapered crab entry tunnel between said front and back frames, and webbing covering said framework including said tunnel.

4. A crab pot comprising a collapsible open framework having top and bottom frames, front and back frames hingedly connected at the front and back of said bottom frame for folding inwardly toward one another in overlapping relation to said bottom frame, short corner posts fixed upright from said bottom frame and arranged to be engaged by said front and back frames when such frames are upright, releasable lock means carried by said posts for holding said front and back frames against said posts, a pair of spaced tracks mounted on said top frame and extending from the front to the back thereof, two pairs of slides journal-mounted, one pair on the top of said front frame and the other pair on the top of said back frame, said slides also being slidably mounted on said track means for holding said top frame on said front and back frames and for lowering said top frame responsive to said folding of the front and back frames, a gate frame hingedly mounted in said top frame, a pair of generally horizontal rigid rims within the framework, webbing covering said gate frame and the rest of said top frame, said front, back and bottom frame, and forming a pair of tapered tunnels between said front and back frames which have said rims as their inner ends, and tie means pulling said rims toward the center of the pot.

References Cited by the Examiner

UNITED STATES PATENTS 2,910,801  11/59  Safarik et al. _____ 43—105
3,045,386  7/62   Coyne _____ 43—100

ABRAHAM G. STONE, *Primary Examiner.*